(12) United States Patent
Youssef et al.

(10) Patent No.: US 10,670,694 B1
(45) Date of Patent: Jun. 2, 2020

(54) SYSTEM AND METHOD FOR HYBRID-WEIGHTED, MULTI-GRIDDED ACOUSTIC SOURCE LOCATION

(71) Applicant: Avelabs America LLC, Wilmington, DE (US)

(72) Inventors: Moustafa Youssef, Cairo (EG); Ahmed Shokry, Cairo (EG)

(73) Assignee: AVELABS AMERICA, LLC, Wilmington, DE (US)

( * ) Notice: Subject to any disclaimer, the term of this patent is extended or adjusted under 35 U.S.C. 154(b) by 0 days.

(21) Appl. No.: 16/523,939

(22) Filed: Jul. 26, 2019

(51) Int. Cl.
  *G01S 5/20* (2006.01)
(52) U.S. Cl.
  CPC .................... *G01S 5/20* (2013.01)
(58) Field of Classification Search
  CPC .................... G01S 5/20
  See application file for complete search history.

(56) References Cited

U.S. PATENT DOCUMENTS

| | | | | |
|---|---|---|---|---|
| 9,730,029 | B2* | 8/2017 | Choudhury | G01S 5/021 |
| 2008/0279046 | A1* | 11/2008 | Showen | G01S 5/18 367/127 |
| 2015/0281910 | A1* | 10/2015 | Choudhury | G01S 5/021 455/456.1 |
| 2017/0243255 | A1* | 8/2017 | Sahasi | G06F 17/212 |

FOREIGN PATENT DOCUMENTS

WO   WO-2017147203 A1 *   8/2017   ......... G06Q 30/0271

OTHER PUBLICATIONS

Matrix creator. https://www.matrix.one/products/creator.
Michael S Brandstein, John E Adcock, and Harvey F Silverman. A practical time-delay estimator for localizing speech sources with a microphone array. Computer Speech and Language, 9(2):153-170, 1995.
Michael S Brandstein and Harvey F Silverman. A robust method for speech signal time-delay estimation in reverberant rooms. In 1997 IEEE International Conference on Acoustics, Speech, and Signal Processing, vol. 1, pp. 375-378. IEEE, 1997.
G Clifford Carter, Albert H Nuttall, and Peter G Cable. The smoothed coherence transform. Proceedings of the IEEE, 61(10):1497-1498, 1973.
Benoit Champagne, Stéphane Bédard, and Alex Stéphenne. Performance of time-delay estimation in the presence of room reverberation. IEEE Transactions on Speech and Audio Processing, 4(2):148-152, 1996.

(Continued)

*Primary Examiner* — Daniel Pihulic
(74) *Attorney, Agent, or Firm* — DLA Piper LLP (US)

(57) ABSTRACT

A system and method using a hybrid-weighted, multi-gridded robust approach to localize a sound source are more accurate and robust that conventional techniques. In one embodiment, the system may determine a distance to the acoustic source using a first grid and weighting combination, may determine an angle to the acoustic source using a second grid and weighting combination and may combine the distance and angle estimates to generate a more robust and accurate acoustic source location determination.

22 Claims, 10 Drawing Sheets

(56) References Cited

OTHER PUBLICATIONS

Maximo Cobos, Fabio Antonacci, Anastasios Alexandridis, Athanasios Mouchtaris, and Bowon Lee. A survey of sound source localization methods in wireless acoustic sensor networks. Wireless Communications and Mobile Computing, 2017, 2017.

Maximo Cobos, Amparo Marti, and Jose J Lopez. A modified srp-phat functional for robust real-time sound source localization with scalable spatial sampling. IEEE Signal Processing Letters, 18(1):71-74, 2011.

Joseph Hector DiBiase. A high-accuracy, low-latency technique for talker localization in reverberant environ¬ments using microphone arrays. Brown University Providence, RI, 2000.

Kevin D Donohue, Alvin Agrinsoni, and Jens Hannemann. Audio signal delay estimation using partial whiten¬ing. In Proceedings 2007 IEEE SoutheastCon, pp. 466-471. IEEE, 2007.

Carl Eckart. Optimal rectifier systems for the detection of steady signals. 1952.

Yiteng Arden Huang and Jacob Benesty. Audio signal processing for next-generation multimedia communication systems. Springer Science & Business Media, 2007.

Charles Knapp and Glifford Carter. The generalized correlation method for estimation of time delay. IEEE transactions on acoustics, speech, and signal processing, 24(4):320-327, 1976.

Byoungho Kwon, Youngjin Park, and Youn-sik Park. Analysis of the gcc-phat technique for multiple sources. In ICCAS 2010, pp. 2070-2073. IEEE, 2010.

Hong Liu and Miao Shen. Continuous sound source localization based on microphone array for mobile robots. In 2010 IEEE/RSJ International Conference on Intelligent Robots and Systems, pp. 4332-4339. IEEE, 2010.

Nilesh Madhu, Rainer Martin, U Heute, and C Antweiler. Acoustic source localization with microphone arrays. Advances in Digital Speech Transmission, pp. 135-170, 2008.

Patrick Marmaroli, Xavier Falourd, and HervéLissek. A comparative study of time delay estimation techniques for road vehicle tracking. In Acoustics 2012, 2012.

Rainer Martin, Ulrich Heute, and Christiane Antweiler. Advances in digital speech transmission. John Wiley & Sons, 2008.

Peter R Roth. Effective measurements using digital signal analysis. IEEE spectrum, 8(4):62-70, 1971.

Bert Van Den Broeck, Alexander Bertrand, and Peter Karsmakers. Time-domain gcc-phat sound source localization for small microphone arrays.

Harry L Van Trees. Detection, estimation, and modulation theory, part I: detection, estimation, and linear modulation theory. John Wiley & Sons, 2004.

Yilu Zhao, Xiong Chen, and Bin Wang. Real-time sound source localization using hybrid framework. Applied Acoustics, 74(12):1367-1373, 2013.

\* cited by examiner

Table 1: Worst case analysis summary.

|  | Rectangular | Polar |
|---|---|---|
| Distance | $\frac{L}{(n-1)\sqrt{2}}$ | $\frac{L}{(n-1)\sqrt{\pi}}$ |
| Angle | $45°$ | $\frac{180°}{n}$ |
| Location | $\frac{L}{(n-1)\sqrt{2}}$ | $\frac{2L}{\sqrt{\pi}} \cdot \sin\left(\frac{90°}{n}\right)$ |

(a) Distance     (b) Location     (c) Angle

Table 2: System parameters.

| Parameter | Range | Default value |
|---|---|---|
| L | 1-30 | 21 |
| n | 2-30 | 20 |
| Weighting function | Unweighted, PHAT, SCOT, Direct fusion, Hybrid weighting | Hybrid weighting |
| Grid topology | Rectangular, Polar, Multi-gridding | Rectangular |

(a) Testbed 1 (car engine).

(b) Testbed 2 (car horn).

| Name | Description |
|---|---|
| Unweighted-Rect | Uses unweighted GCC to determine the angle and the distance. Uses rectangular grid to check the possible candidates. |
| PHAT-Rect | Uses PHAT a weighting function for estimating both the angle and the distance. Uses rectangular grid to check the possible candidates. |
| PHAT-Polar | Uses PHAT a weighting function for estimating both the angle and the distance. Uses polar grid to check the possible candidates. |
| Hybrid-Rect | Uses a hybrid weighting approach that uses unweighted SRP to determine the distance and the PHAT to determine the angle. Uses rectangular grid. |
| Hybrid-Polar | Uses a hybrid weighting approach that uses unweighted SRP to determine the distance and the PHAT to determine the angle. Uses polar grid to check the possible candidates. |
| Hybrid-Hybrid | Uses a hybrid weighting approach that uses unweighted SRP to determine the distance and the PHAT to determine the angle. Uses a rectangular grid with unweighted SRP to determine the distance and a polar grid with PHAT to determine the angle. |

FIGURE 12

| Technique | Testbed 1 | | Testbed 2 | |
|---|---|---|---|---|
| | Angle | Location | Angle | Location |
| PHAT-Rect | 6.5° (-6400%) | 3.2 (-6.7%) | 17.7° (-96.6%) | 2.95 (-5.35%) |
| Direct fusion (Not in Figure 13 & 14) | 8.1° (-8000%) | 3.2 (-6.7%) | 16.7° (-85.5%) | 2.9 (-3.57%) |
| Unweighted-Rect | 8.1° | 3.2 | 16.9° | 2.95 |
| PHAT-polar | 0.1° | 4.9 | 10.6° | 4.3 |
| Hybrid-rect | 6.5° | 3.2 | 17.8° | 3.2 |
| Hybrid-polar | 0.1° | 4 | 9° | 4.3 |
| Hybrid-hybrid | 0.1° | 3 | 9° | 2.8 |

FIGURE 15

(a) Testbed 1 (car engine).

(b) Testbed 2 (car horn).

SYSTEM AND METHOD FOR HYBRID-WEIGHTED, MULTI-GRIDDED ACOUSTIC SOURCE LOCATION

FIELD

The disclosure relates generally to acoustic source location determining and in particular to acoustic source location determining using hybrid weighting and one or more grids.

BACKGROUND

Estimating the position of an acoustic source using a microphone array is an active area of research that has a number of practical applications. These include human-robot interaction, speech acquisition, determining the direction/location of a user in video conferencing applications as well as indoor and outdoor localization applications. Due to many factors such as environment noise and reverberation, sound source localization remains as a challenging problem.

Two of the popular approaches for acoustic source localization are the time difference of arrival (TDoA) and steered response power (SRP) as discussed in Rainer Martin et al., "Advances in digital speech transmission", John Wiley& Sons, 2008. The TDoA-based techniques are based on estimating the time difference of arrival of a transmitted signal arriving from an acoustic source at the different spatially separated microphone pairs. This is usually performed by estimating the cross-correlation between the different pairs. The source position is then calculated based on the TDoA estimation and array geometry, usually as the intersection of multiple hyper-parabolas. This approach has the advantage of not requiring synchronization between the source and the microphones array.

The second steered response power approach is based on virtually steering the microphone array to various candidates locations for the acoustic source based on a pre-defined grid as discloses in Nilesh Madhu et al., "Acoustic source localization with microphone arrays", Advances in Digital Speech Transmission, pages 135-170, 2008. This is based on the cross-correlation calculation between the arrival time at the different microphone-pairs in the microphone array. Specifically, the technique searches for the peak of the output power through analyzing the spatio-spectral correlation matrix derived from the signals that arrive at the different microphone pairs from the source. The location with the highest output power is considered to be the estimated source location.

To enhance the estimation of the cross-correlation, different weighting functions can be used to generalize the cross correlation calculation such as ROTH, SCOT, PHAT, ML, and the Eckart filter as described in Yiteng Arden Huang et al., "Audio signal processing for next-generation multimedia communication systems", Springer Science & Business Media, 2007, Charles Knapp and Glifford Carter, "The generalized correlation method for estimation of time delay", IEEE transactions on acoustics, speech, and signal processing, 24(4):320{327, 1976, Byoungho Kwon et al., "Analysis of the gcc-phat technique for multiple sources", ICCAS 2010, pages 2070-2073. IEEE, 2010, Hong Liu and Miao Shen, "Continuous sound source localization based on microphone array for mobile robots", 2010 IEEE/RSJ International Conference on Intelligent Robots and Systems, pages 4332-4339. IEEE, 2010, and Patrick Marmaroli et al., "A comparative study of time delay estimation techniques for road vehicle tracking", Acoustics 2012 and Bert Van Den Broeck et al., "Time-domain gcc-phat sound source localization for small microphone arrays" (2016). These functions sharpen the cross correlation peak and can lead to more accurate results. Similarly, to obtain the SRP, a grid of points is usually examined for the possible source location. This grid is usually taken as a rectangular grid.

Generalized Cross Correlation Given that the location of the sound source is unknown, one needs a way to estimate the TDoA. The cross-correlation (CC) approach is one of the most popular approaches to estimate the TDoA. The cross-correlation between two signals is computed where one of the signals $x_1$ of size N is a (similar) delayed version of the other $x_2$ by a time τ. The highest peak of the cross-correlation corresponds to T.

In real environments, there are many factors including noise and reverberation, that affect the position of the peak as discussed in Michael S Brandstein and Harvey F Silverman, "A robust method for speech signal time-delay estimation in reverberant rooms", 1997 IEEE International Conference on Acoustics, Speech, and Signal Processing, volume 1, pages 375-378. IEEE, 1997 and Benoit Champagne et al., "Performance of time-delay estimation in the presence of room reverberation", IEEE Transactions on Speech and Audio Processing, 4(2):148-152, 1996. To address this problem, the Generalized Cross Correlation (GCC) was introduced as discussed in Charles Knapp and Glifford Carter, "The generalized correlation method for estimation of time delay", IEEE transactions on acoustics, speech, and signal processing, 24(4):320-327, 1976. It implements a frequency domain weighting of the cross correlation to sharpen the cross-correlation peak and make it more robust to the disturbing factors.

The time difference of arrival (TDoA), $\tau_{m_i;m_j}$, refers to the difference of propagation time from the source location Xs to pairs of microphones mi and mj locations and defined by:

$$\tau_{m_i,m_j} = \frac{\|X_s - m_i\| - \|X_s - m_j\|}{c} \quad (1)$$

where c is the sound propagation speed. To get an estimation value for the TDoA $\tau_{m_i;m_j}$, the GCC function needs to be calculated on the received signals at mi and mj. By assuming that we have only one source, the signal received by microphones mi is shown as a follows $$x_i(t) = h_i(t)s(t - \tau_i) + n_i(t) \quad (2)$$

where $h_i$ is a microphone-dependent attenuation term that accounts for the propagation losses, s(t) is the source signal, τi the sound propagation delay from the source to the mi microphone, and ni is a microphone-dependent noise signal.

The GCC can be calculated efficiently using the discrete-time Fourier transform (DTFT). Given a pair of microphones, mi and mj with i≠j, the GCC between Xi(t) and Xj(t) is written as:

$$r_{m_i,m_j}(\tau) \triangleq \frac{1}{2\pi} \int_{-\pi}^{\pi} X_i(\omega) X_j^*(\omega) W_{i,j}(\omega) e^{j\omega\tau} d\omega \quad (3)$$

where Xi(ω) and Xj(ω) are the Fourier transforms of xi(t) and xj(t) respectively and * is the conjugate operator. The Wij(ω) presents a suitable weighting function which sharpens rij(τ) for a better estimate for $\tau_{ij}$. If Wij(ω)=1 for all ω, the standard unweighted cross correlation formula is obtained.

Finally, the time difference of arrival between a pair of microphones mi and mj is estimated as:

$$\hat{\tau}_{m_i,m_j} \triangleq \frac{\mathrm{argmax}_\tau\, r_{m_i,m_j}(\tau)}{F_s} \qquad (4)$$

where $F_s$ is a sampling frequency.

The Roth Weighting Function

The Roth correlation weights the cross correlation according to the Signal to Noise Ratio (SNR) value of the signal as discussed in Peter R Roth, "Effective measurements using digital signal analysis", IEEE spectrum, 8(4):62-70, 1971. Its results approximate an optimum linear Wiener-Hopf filter as discussed in Harry L Van Trees, "Detection, estimation, and modulation theory, part I: detection, estimation, and linear modulation theory", John Wiley & Sons, 2004. The frequency bands with a low SNR obtain a poor estimate of the cross correlation and therefore are attenuated versus high SNR bands. The Roth function is defined as follows, $$W_{ij}(\omega) = \frac{1}{X_i(\omega)X_i^*(\omega)} \qquad (5)$$

The SCOT Weighting Function

A variation of the ROTH weighting function is the Smoothed Coherence Factor (SCOT) (discussed in G Clifford Carter et al., "The smoothed coherence transform", Proceedings of the IEEE, 61(10):1497-1498, 1973) which acts upon the same SNR-based weighting concept but allows both signals being compared to have a different spectral noise density function. It is defined as follows, $$W_{ij}(\omega) = \frac{1}{\sqrt{X_i(\omega)X_i^*(\omega)X_j(\omega)X_j^*(\omega)}} \qquad (6)$$

The PHAT Weighting Function

In environments with high reverberation, the Phase Transform (PHAT) weighting function (discussed in Charles Knapp et al., "The generalized correlation method for estimation of time delay", IEEE transactions on acoustics, speech, and signal processing, 24(4):320-327, 1976) is the most appropriate weighting function as it normalizes the amplitude of the spectral density of the two signal and uses only the phase information to compute the cross correlation. It is applied to speech signals in reverberant rooms by Brandstein and Silverman in "A robust method for speech signal time-delay estimation in reverberant rooms", 1997 IEEE International Conference on Acoustics, Speech, and Signal Processing, volume 1, pages 375-378. IEEE, 1997. It is defined as follows:

$$W_{ij}(\omega) = \frac{1}{|X_i(\omega)X_j^*(\omega)|} \qquad (7)$$

However, the GCC-PHAT achieves very good performance when the SNR of the signal is high but deteriorates when the noise level increases.

The ML Weighting Function

Another weighting function of interest is the Hannan and Thomson's weighting function (disclosed in Michael S Brandstein et al., "A practical time-delay estimator for localizing speech sources with a microphone array, Computer Speech and Language, 9(2):153-170, 1995 and Charles Knapp and Glifford Carter, "The generalized correlation method for estimation of time delay", IEEE transactions on acoustics, speech, and signal processing, 24(4):320-327, 1976) that is also known as Maximum Likelihood (ML) correlation. This weighting function also tries to maximize the SNR ratio of the signal. For speech applications, the approximation may be:

$$W_{ij}(\omega) = \frac{|X_i(\omega)||X_j^*(\omega)|}{|N_i(\omega)|^2|X_j(\omega)|^2|N_j(\omega)|^2|X_i(\omega)|^2} \qquad (8)$$

where $N_i(\omega)$ is the noise power spectra.

The Eckart Weighting Function

The Eckart filter (disclosed in Carl Eckart, "Optimal rectifier systems for the detection of steady signals" (1952)) maximizes the deflection criterion, i.e. the ratio of the change in mean correlation output due to the signal present compared to the standard deviation of correlation output due to noise alone. The weighting function achieving this is:

$$W_{ij}(\omega) = \frac{S_i(\omega)S_i^*(\omega)}{N_i(\omega)N_i^*(\omega)N_j(\omega)N_j^*(\omega)} \qquad (9)$$

where $S_i(\omega)$ is the speech power spectra.

Steered Response Power

The steered response power (SRP) is a beamforming-based approach (disclosed in Maximo Cobos et al., "A survey of sound source localization methods in wireless acoustic sensor networks", Wireless Communications and Mobile Computing, 2017). SRP aims to maximize the power of the received sound using a filter-and-sum beamformer steered to a set of candidates defined by a predefined spatial grid. This grid is usually taken as a rectangular grid (as disclosed in the Maximo article above and Joseph Hector DiBiase, "A high-accuracy, low-latency technique for talker localization in reverberant environments using microphone arrays", Brown University Providence, R.I., 2000). The steered response power (SRP) at a spatial point $x=[x;\ y;\ z]^T$ on the grid can be defined as:

$$P(x) = \sum_{m_1=1}^{M}\sum_{m_2=1}^{M} r_{m_i,m_j}(\tau_{m_1,m_2}(x)) \qquad (10)$$

where r is the cross-correlation defined in Equation 3. Note that the SRP accuracy depends on both the chosen weighting function for calculating the GCC as well as the chosen grid points to evaluate.

Thus, it is desirable to provide a system and method for sound source localization that improves the accuracy and speed of the above known technique and it is to this end that the disclosure is directed.

BRIEF DESCRIPTION OF THE DRAWINGS

FIG. 12 shows an example of the different combinations of weighting functions and grid that may be used for the acoustic source localization system;

FIG. 15 illustrates the performance of the acoustic localization system for the examples in FIGS. 13 and 14.

DETAILED DESCRIPTION OF ONE OR MORE EMBODIMENTS

The disclosure is particularly applicable to a source localization system and method for an acoustic source that uses a particular combination of weighting functions and grids and it is in this context that the disclosure will be described. It will be appreciated, however, that the system and method has greater utility since it can be used to locate other sources in other frequency ranges and may use different or other weighting functions and/or grids that are all within the scope of the disclosure. Thus, the disclosure describes a hybrid-weighting, multi-gridded approach which enhances source localization in terms of robustness and accuracy. As disclosed below, the system and method may use different weighting function that lead to the best results as compared to using a single weighting function. In addition, different grid topologies (e.g. rectangular and polar) lead to different performance under different metrics. The system and method also separates the distance and angle estimation to the source that leads to more robust and accurate results. As discussed below, the source localization system and method leads to results, from two realistic environments, that outperform state-of-the-art techniques by at least 85.5% for the direction estimation and 3.57% for the location estimation with a short estimation duration of 0.15 seconds. Furthermore, the disclosed source localization system and method may be used for various non-acoustic sources, such as for example, a source in an RF/wireless network.

Figure 1:
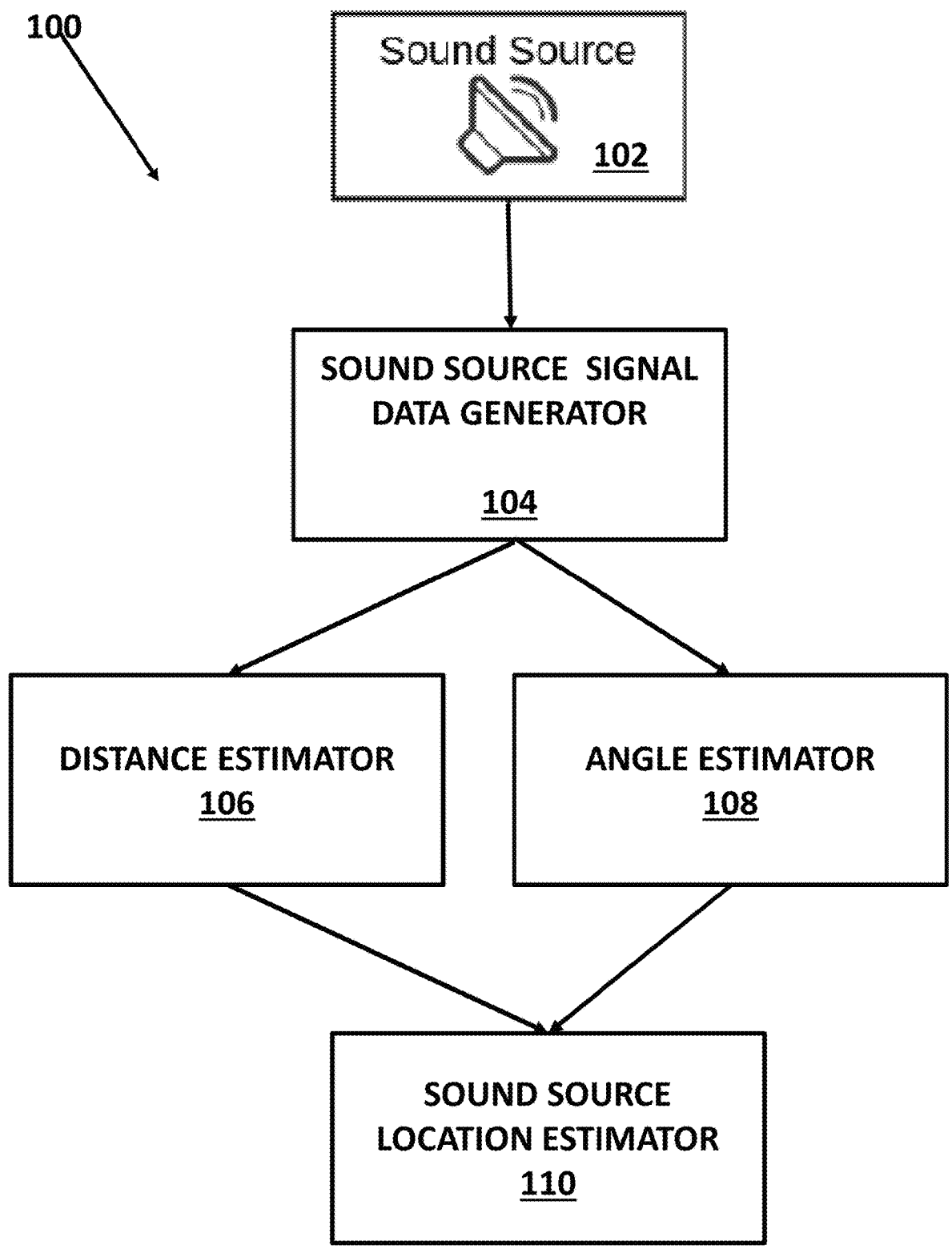
FIG. 1 illustrates a source localization system.
Figure 2:
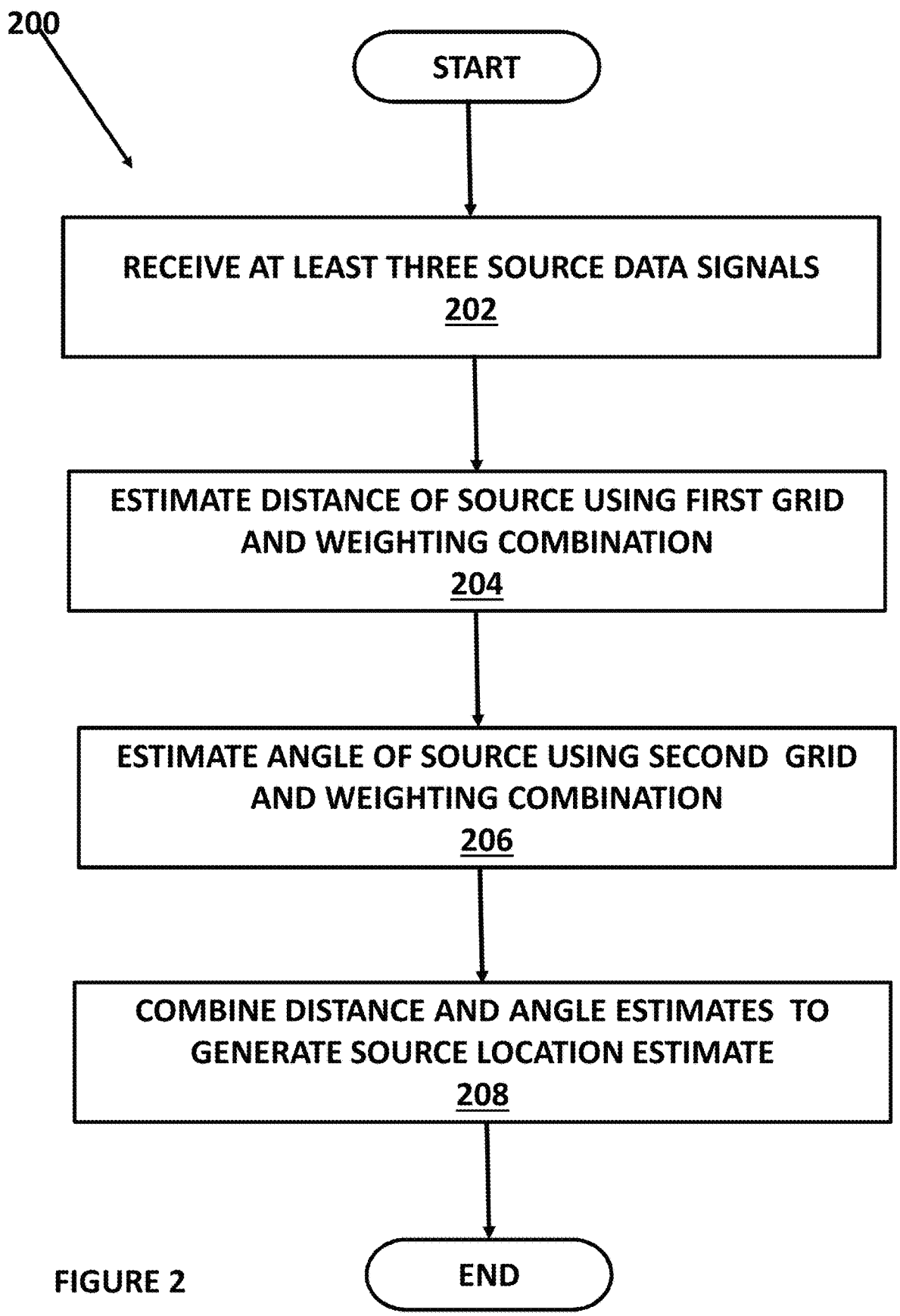
FIG. 2 illustrates a method for source localization.

FIG. 1 illustrates a source localization system 100 and FIG. 2 illustrates a method 200 for source localization in which an estimated location of a sound source 102 may be determined using the novel methodology described below.

In order to determine/estimate the location of the sound source, the distance to the source and angle to the source from a plurality of sensors is determined. To determine both the distance and angle to the source, at least three signals from the source may be used so that the method 200 receives at least three source data signals (202). The system 100 may have a sound source signal data generator 104 that may include a plurality of sensors, such as microphones, that are connected to a sound segmentor (that may be implemented in hardware or as a plurality of lines of instructions being executed by a processor or a DSP, etc.) that generates the individual signals from each sensor that may be input into the system.

Using the plurality of signals from the sensors, a distance estimator 106 (that may be implemented in hardware or as a plurality of lines of instructions being executed by a processor or a DSP, etc.) may estimate/determine a distance from the source to the sensors using a first grid and weighting combination (204). In particular, the distance estimator 106 may use a combination of a grid (polar or rectangular, for example) and a weighting of the data (unweighted GCC or PHAT, for example) (an example of some of the combinations are shown in FIG. 12) to generate the distance estimate for the source.

Using the plurality of signals from the sensors, an angle estimator 108 (that may be implemented in hardware or as a plurality of lines of instructions being executed by a processor or a DSP, etc.) may, separately and independently of the distance estimator, estimate/determine an angle between the source and the sensors using a second grid and weighting combination (206). The second grid and weighting combination may be the same as the first grid and weighting combination or it may be different as shown in the example in FIG. 12.

The system also may have a sound source location estimator 110 (that may be implemented in hardware or as a plurality of lines of instructions being executed by a processor or a DSP, etc.) that receives the estimated distance and angle of the source from the distance estimator 106 and the angle estimator 108 and generate a source location estimate (208) in a well known manner. Thus, the novel source location system and method separates the distance estimation and the angle estimation, uses a first and second combination of grid and weighting for each estimation and then generates a more accurate and more rapidly determined source location estimate by combining the distance and angle estimates.

Figure 3:
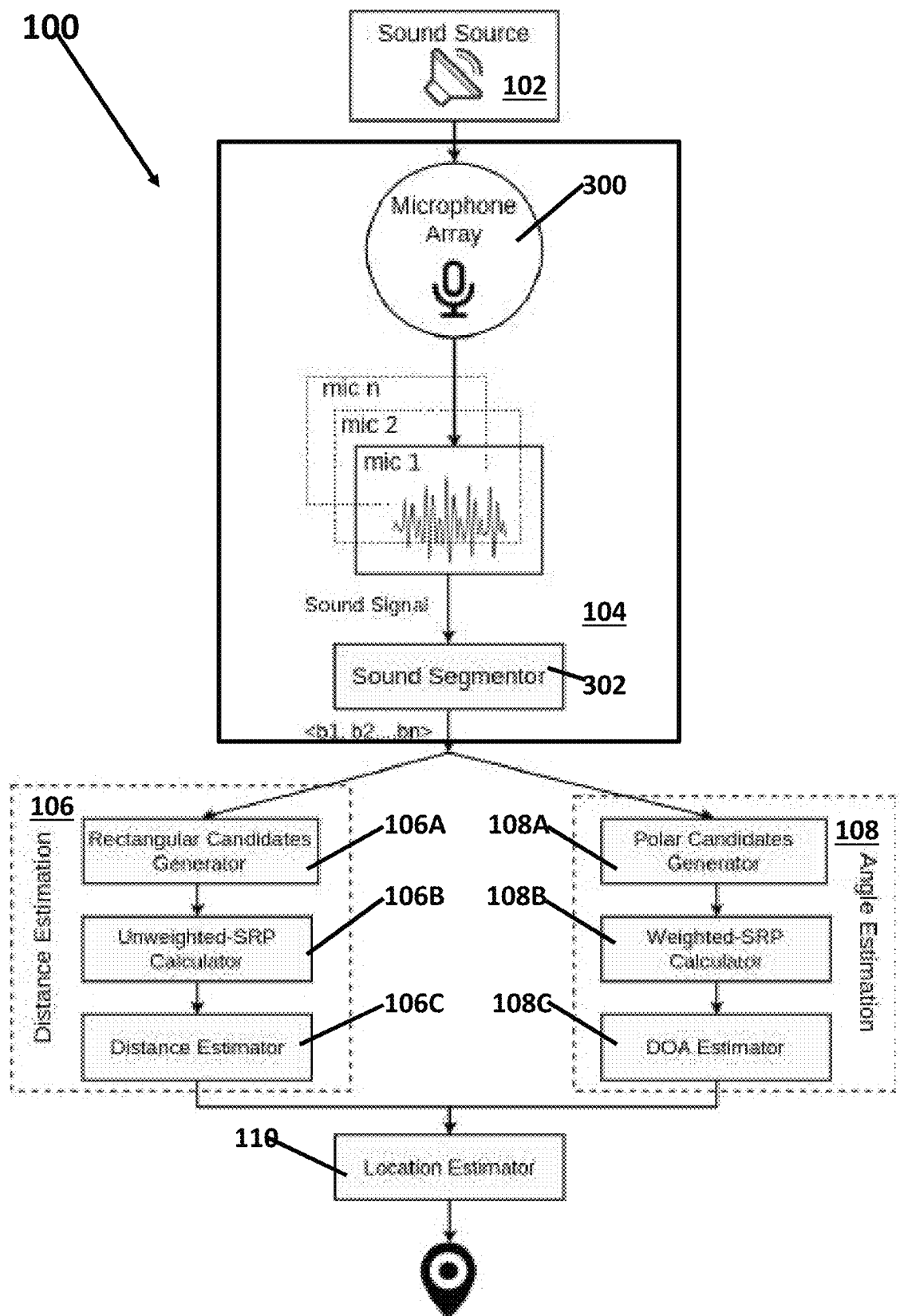
FIG. 3 illustrates another embodiment of the source localization system that uses particular grids and particular weightings and may be used for acoustic sources.

FIG. 3 illustrates another embodiment of the source localization system 100 that uses particular grids and particular weightings and may be used for acoustic sources in which the sound source 102 may be an acoustic sound whose signals are picked up in real time by an array of microphones 300 in the sound source signal data generator 104 that generates one or more microphone signals (mic n, . . . , mic 2, and mic 1). In this embodiment, the location of the acoustic source is determined based on a distance estimate and an angle estimate. As with the embodiment in FIG. 1, the array of microphones has at least 3 microphones, but may have more than 3 microphones. Furthermore, the system does not require any specific configuration for the microphone array. However, in one embodiment, the commercially available Matrix-creator hardware (further details of which may be found at github.com/matrix-io/matrixio-kernel-modules/releases that is incorporated herein by reference) which is a circular array with 8 equally-spaced microphones. It is known that there is a relation between the distance between a pair of microphones and the maximum allowed source frequency that can be detected. This relation is: $d \leq c/2f_{max}$ where d is the distance between the pair of microphones, c is sound velocity, and $f_{max}$ is the maximum frequency. Since the disclosed source localization system and method may use any array configuration (either number of microphones and/or distance between microphone pairs), the system and method may be used to detect a source with any range of frequencies. For example, the hardware used in the exemplary embodiment can detect frequencies between 8 kHz and 48 kHz, but the source localization system and method can be used to detect a different range of frequencies when a different array configuration is used.

The sound source signal data generator 104 may further have a well known sound segmentor 302 that divides the signals into blocks <b1, b2, . . . , bn>. In more detail, the sound segmentor 302 is responsible for splitting the sound signal into equally-sized blocks and these blocks is then fed into different system components to estimate the source location. Each block is processed by the system to provide a single location estimates. The different estimates from the different blocks can be post-processed to obtain more accurate location estimate, e.g. by applying a moving average filter. The elements in the sound source signal data generator 104, as above, may be implemented in hardware or software or a combination of hardware and software. In an exemplary embodiment, the source 102 was a car as a sound source that plays its horn and its engine, the array of microphones used the Matrix-Creator hardware with 8 microphones and elements 106, 108, 302 and 110 were implemented using proprietary software code written in Python, although other programming languages could also be used.

Like the embodiment in FIG. 1, in this embodiment, the distance estimator 106 and angle estimator 108 are run in parallel based on the blocks of sound data. In the example shown in FIG. 3, the distance estimator 106 may use a rectangular grid from a rectangular candidate generator 106A, may use an unweighted steered response power (SRP) method using a calculator 106B and may estimate the distance using a distance estimator 106C wherein each of these elements may be implemented in hardware, software or a combination of hardware and software. For example, each element may be a plurality of lines of instructions that are executed by a processor to implement the processes described below. In more detail, in order to estimate the distance of the source from the array of sensors/matrix, a generalized cross correlation (GCC) technique is used without any weighting. In particular, the technique obtains the input sound block spectrum in the frequency domain and then estimates the correlation functions between each pair of microphones. The calculations are performed in the frequency domain for more efficient calculations. The different cross correlation values from each pair of microphones are then combined (i.e. summed) using a known steered response power (SRP) algorithm to estimate the source distance from the matrix. Specifically, the SRP algorithm is the sum of the Generalized Cross-Correlations (GCCs) for the different microphone pairs based on assuming a certain source location in the area of interest. To do that, a search over the area of interest over a virtual grid is performed using a rectangular grid, which is shown to give the best performance for estimating the distance.

In the example shown in FIG. 3, the angle estimator 108 may use a polar grid from a polar candidate generator 108A, may use a weighted steered response power (SRP) method using a calculator 108B and may estimate the distance using an DOA estimator 108C wherein each of these elements may be implemented in hardware, software or a combination of hardware and software. For example, each element may be a plurality of lines of instructions that are executed by a processor to implement the processes described below. In more detail, to estimate the angle of the source relative to the matrix, the GCC is also used. However, in this case, the method may use a PHAT or SCOT weighting functions for the GCC calculations and use a polar grid for the SRP that leads to the best estimation accuracy.

The estimated distance and angle of the source are finally combined (location estimator 110) to estimate the source location. Note that the method and system are unique in using a hybrid-weighting multi-gridded approach which enhances sound source localization in terms of robustness and accuracy. Specifically, we use different weighting functions (unweighted and (SCOT and PHAT)) concurrently for the first time, which, as we show in the results, leads to the best results as compared to using a single weighting function. In addition, we use different grid topologies (rectangular and polar) that lead to best accuracy for distance and angle estimation respectively. Finally, the system and method separate the distance and angle estimation as it leads to more robust and accurate results.

Hybrid-Weighting Approach

The system and method uses a hybrid weighting approach in which different weighting functions (including no weighting) are used for the different distance and angle estimate to achieve more accurate results that typical methods as discussed below in more detail. The use of different weighting functions leads to different performance based on the used metric (e.g. distance or angle). Hence, the system and method may use two different techniques that may include: direct fusion and/or hybrid weighting.

Direct Fusion

This technique estimates the SRP values from the different weighting functions (e.g. PHAT and SCOT), adds the SRP values from different weighting functions at candidate locations on the grid, and finally picks the candidate location with the maximum total SRP value as the estimated location. Although the direct fusion can enhance the accuracy of estimating certain metrics, it can make other metrics estimation worse as discussed below.

Hybrid Weighting (Independent Fusion)

Figure 4:
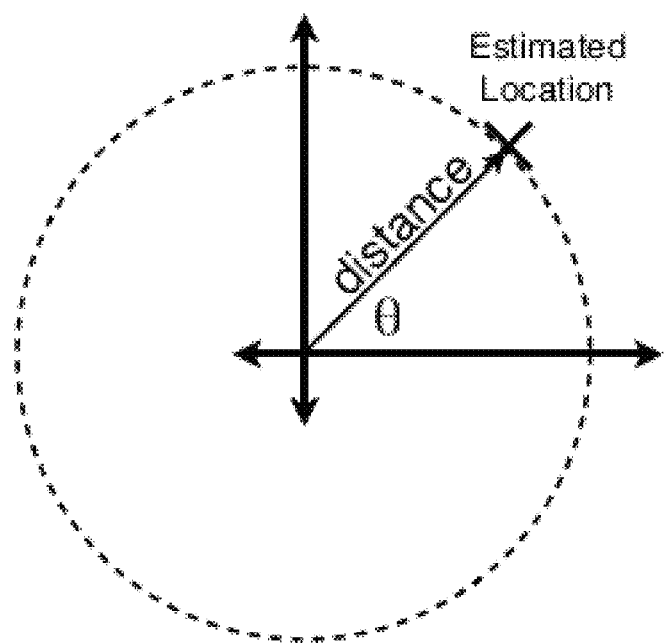
FIG. 4 illustrates a method for determining an estimate location of a source.

This technique is motivated by observing that estimating the distance with high accuracy and estimating the direction of arrival (DoA) angle independently with high accuracy may lead to the best estimate for sound source location. Hence, unlike the direct fusion technique, this technique splits the location estimation problem into two independent sub-problems: distance estimation and angle estimation to make use of the advantages of the different weighting functions independently. The hybrid weighting technique calculates both unweighted and weighted (e.g. PHAT) SRP at different candidate locations independently. After that, the location with the maximum unweighted SRP power is used to estimate the distance and the location with the maximum weighted power (PHAT, SCOT, etc) is used to estimate DoA angle. Finally, this technique fuses the distance and angle estimates to get the final estimated location as the intersection between the distance circle and the DoA angle line as shown in FIG. 4. Note the results show that a unity weighting function is the best for distance estimation while the PHAT or SCOT weighting functions are the best for angle estimation. Nonetheless, other weighting functions not included in our list can also be employed. One of the main novelty here is the separation of angle and distance estimation with different weighting functions and grids, independent of the specific weighting function used.

Multi-Gridding Approach

Figure 5:
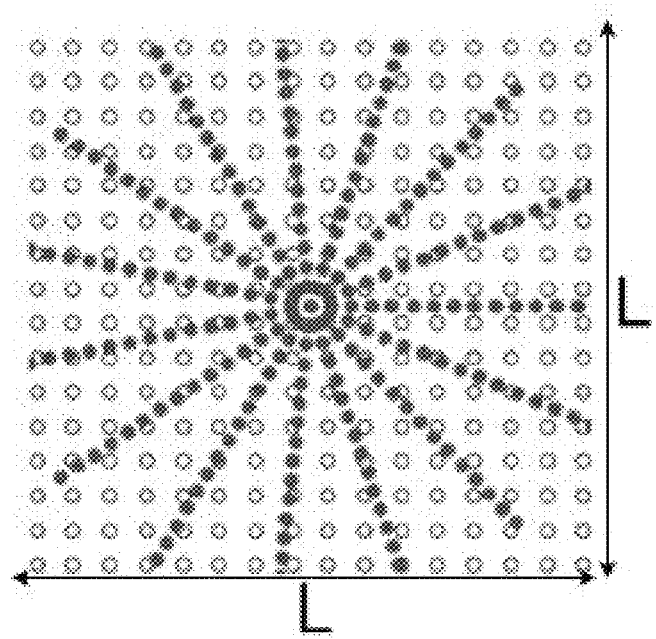
FIG. 5 illustrates rectangular and polar grid points distributed over an area.

As discussed above, the system and method uses a multi-gridded approach in which different grids may be used for each of the distance estimation and the angle estimation to generate a location estimate as shown in FIG. 4. FIG. 5 shows an example of rectangular and polar grid points distributed over an area.

The multi-gridded approach uses different grids since the specific grid search topology uses leads to different angle and distance resolutions which affect the estimated angle, distance and location accuracy so that the multi-gridding approach estimates the distance and the angle accurately using different grids. One embodiment of the system and method concurrently calculates the SRP for two sets of candidates distributed over rectangular and polar grids in which the rectangular grid is used to estimate the distance and the polar grid is used to estimate the angle.

FIG. 5 shows $n^2$ grid points distributed over an area of size $L^2$ for both topologies. The rectangular grid is created by generating $n^2$ points spaced as follows:

$$dx = dy = \frac{L}{n-1} \quad (11)$$

where dx and dy are the spacing between points in the x and y directions respectively. On the other hand, the polar grid is created by generating $n^2$ points on polar axes of radius R=

$$\frac{L}{\sqrt{\pi}}$$

spaced as follows:

$$dr = \frac{R}{n-1} \text{ and} \quad (12)$$

$$d\theta = \frac{360°}{n} \quad (13)$$

where dr is the points spacing on one polar axis and dΘ is the angle separation between axes.

Figures 6, 7:
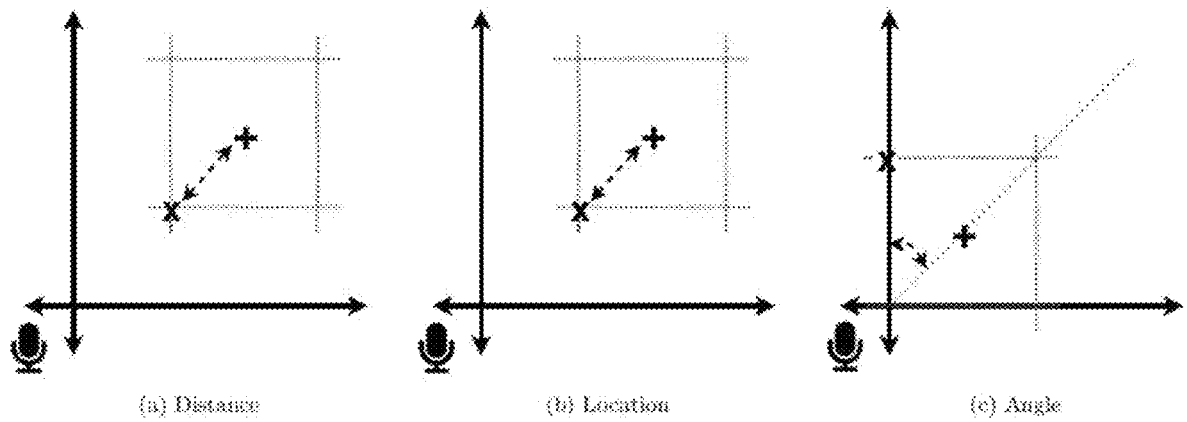
FIG. 6 illustrates a worst case estimated location of a source with a rectangular grid for different metrics.
FIG. 7 is a table showing the worst case analysis summary.
Figures 8, 9:
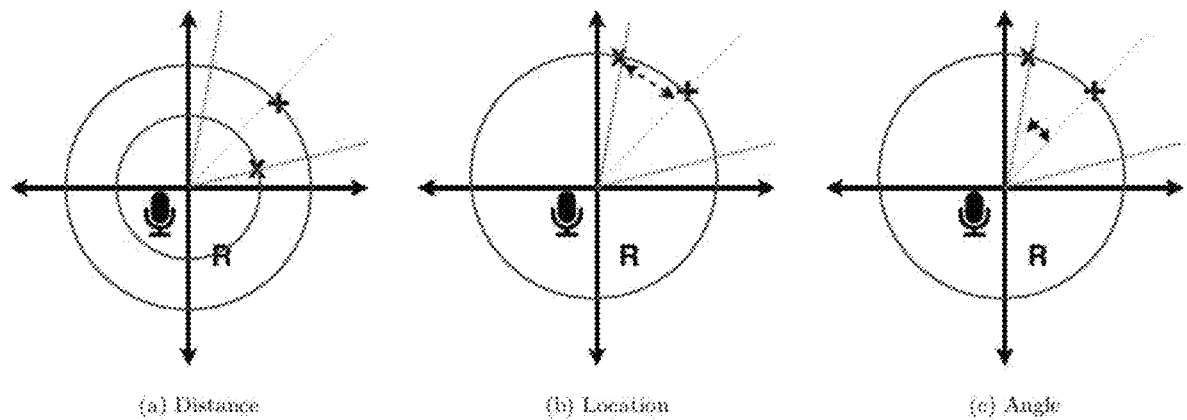
FIG. 8 illustrates a worst case estimated location of a source with a polar grid for different metrics.
FIG. 9 illustrates an example of the system parameters for the acoustic source localization system.

Assuming a perfect localization system, i.e. a system that estimates the location of the source to the nearest candidate point on the grid to the true location, the worst case analysis for distance, location, and angle estimation using rectangular and polar grids may be determined as shown in FIG. 6 for the rectangular grid and FIG. 8 for the polar grid.

FIG. 6 shows the worst case analysis for rectangular grid for the different metrics. The plus sign (+) shown in each subfigure refers to the ground truth source location while the (x) sign refers to the estimated one. The dashed lines represent the worst case error. Subfigure (a) shows the worst case distance error where the true location is on the center of a grid cell and the estimated location is on one of the grid cell corners. Subfigure (b) shows the worst case location error where the true location is on the center of a grid cell and the estimated location is on one of the grid cell corners. Subfigure (c) shows the worst case angle error where the true location is on the center of the nearest grid cell to the axis, the estimated location is on one of the grid cell corners.

FIG. 8 shows the worst case analysis for polar grid in which, like FIG. 6, the plus sign (+) refers to the true source location while the (x) sign refers to the estimated one. In the subfigures in FIG. 8, the dotted lines represent two polar axes on which the grid points lie and the black dashed line represents the worst case error. Subfigure (a) shows the worst case distance error where the true location is in the middle between two axis and the estimated location on one of the two axis, and the spacing between the estimated and the true location is dΘ/2 in Θ direction and dr in r direction. Subfigure (b) shows the worst case location error where the true location is in the middle between two axis and the estimated location is on one of the two axis and the spacing between the estimated and the true location is dΘ/2 in Θ direction. Subfigure (c) shows the worst case angle error where the true location is in the middle between two axis, the estimated location on one of the two axis and the spacing between the estimated and the true location is dΘ/2 in Θ direction.

The subfigures in FIG. 6 shows that the worst case location and distance error for the rectangular grid is:

$$\frac{L}{(n-1)\sqrt{2}},$$

while the worst case angle error is 45°.

On the other hand, FIG. 8 shows the worst case scenarios for the polar grid. The worst case location error is $$\frac{2L}{\sqrt{\pi}} \cdot \sin\left(\frac{90°}{n}\right),$$

the distance error is $$\frac{L}{(n-1)\sqrt{\pi}}$$

and the angle error $$\frac{180°}{n}.$$

FIG. 7 that shows Table 1 summarizes the worst case analysis.

The table shows that the worst case distance error for the rectangular and the polar grids is almost equal. The table also shows that for n>4, the worst case angle error for the polar grid is better than the rectangular grid. Generally, the angle resolution of the polar grid is better than the rectangular grid while the distance resolution is better for the rectangular grid. Thus, the disclosed methodology uses the multi-gridded approach as described above.

Performance Evaluation

Figure 9A:
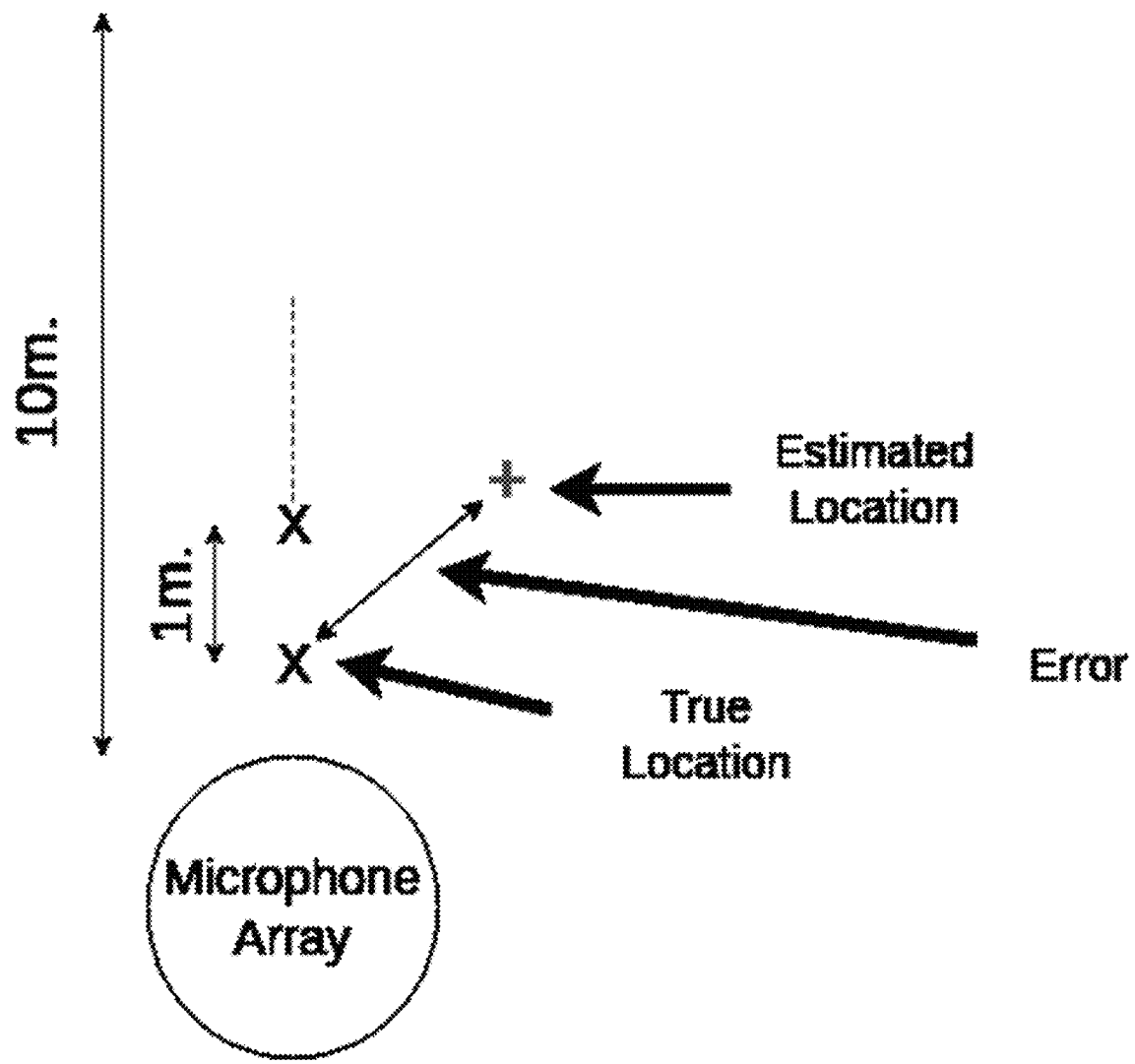
FIG. 9A illustrates more details of the evaluation of the acoustic source localization system.

To evaluate the performance of the proposed system described above, two testbeds are used: one using a car engine as the source and another one using a car horn. For purposes of the performance evaluation, an embodiment of the system may have a sensor array that consists of 8 commercially available MEMS MP34DB02 audio sensor digital microphones (further details of which may be found www.matrix.one/products/creator that is incorporated herein by reference). Using the exemplary system parameters shown in FIG. 9, data is collected on different points from 1 meter up to 10 meters away from the sensor array as shown in FIG. 9A in which two experiments are conducted with the same array configuration except that the sound source for experiment 1 is a car horn and the sound source for experiment 2 is a car engine. For the evaluation, the source plays/runs at different locations that have different distances from the array as shown in FIG. 9A. At each tested location, the sound may be played for one minute. The 1 min sound is divided into different blocks of sound, each one with 0.5 second. For each block, a location is estimated using the different techniques and the error is calculated as the distance between the estimated location by the system and the true location the source is at. Thus, in the performance evaluation, we show the performance of the direct fusion methodology using different weighting functions and then the overall system performance under different combination of weighting functions and grid topologies.

Direct Fusion Performance

Figure 10:
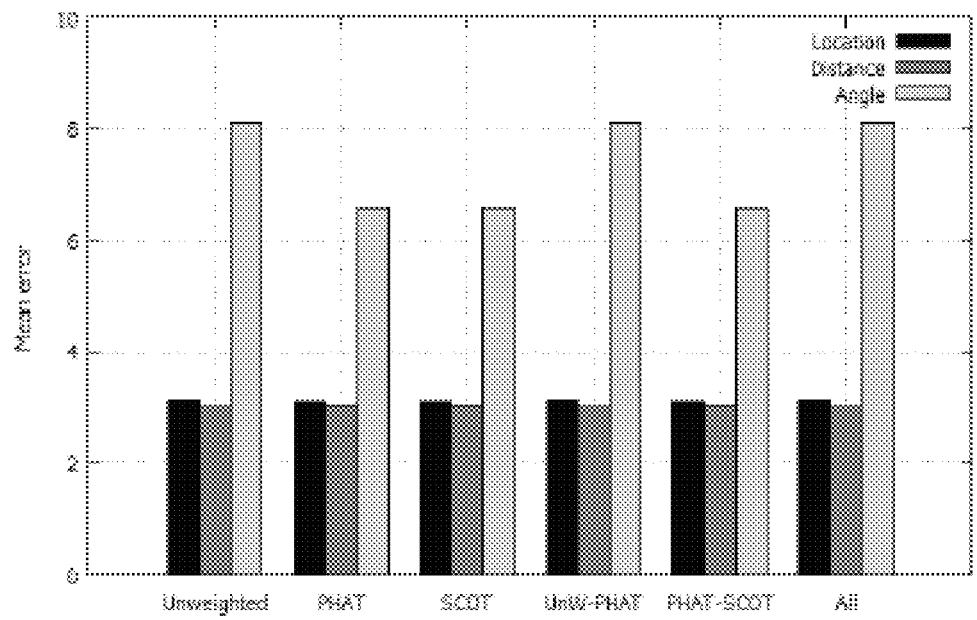
FIG. 10 illustrates results from a car engine example using different weighting functions.
Figure 11:
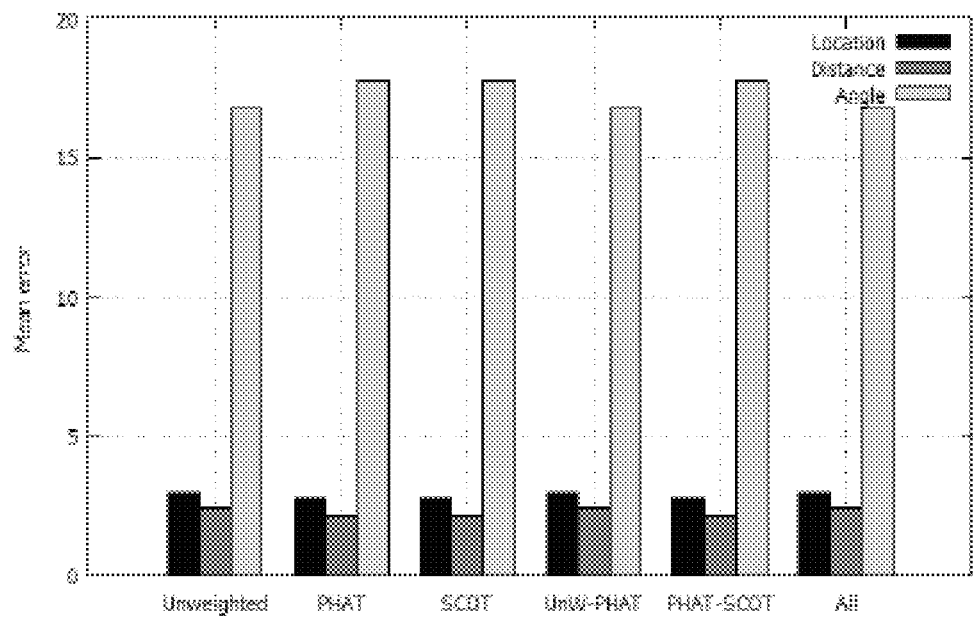
FIG. 11 illustrates results from a car horn example using different weighting functions.

FIG. 10 illustrates results from a car engine example using different weighting functions while FIG. 11 illustrates results from a car horn example using different weighting functions. In more detail, each figure shows the accuracy of the different metrics (location, distance and angle as shown by the different colored bars where, for example the location metric is shown by a dark bar and the angle is shown by the lightest colored bar) using different weighting functions (unweighted, PHAT, SCOT, unW-PHAT, PHAT-SCOT and All) for the "direct fusion" technique. As shown in the figures, there is no single weighting function nor a combination of a number of them that lead to the best accuracy under all metrics.

In more detail, FIGS. 10 and 11 show the accuracy of fusing different weighting functions. These figures shows that using the unweighted GCC enhances the distance estimation accuracy, but leads to bad angle estimation. The figures also show that using PHAT and/or SCOT weighted SRP leads to the best estimate of the DoA angle, but leads to worse distance and location estimation error. The figures also show that combining all of the techniques together does not enhance the overall accuracy. Therefore, the direct fusion technique cannot be used in general to enhance the accuracy or the robustness of acoustic sources localization. This highlights the need of the hybrid-weighting, hybrid-gridding approach.

Overall System Performance

Figure 13:
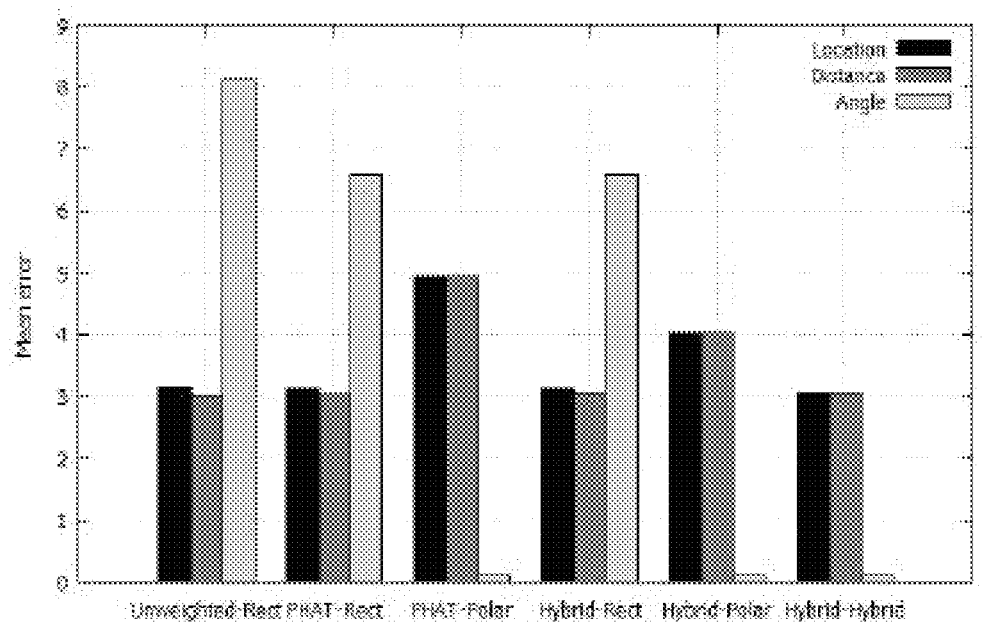
FIG. 13 illustrates results from a car engine example using different combinations of weighting functions and grid using the acoustic source localization system.
Figure 14:
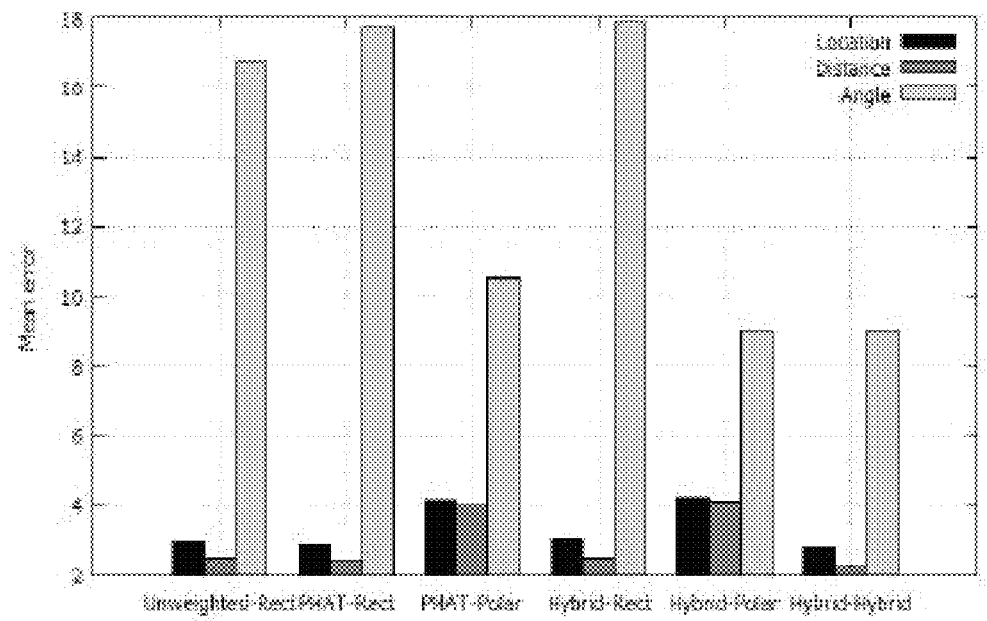
FIG. 14 illustrates results from a car horn example using different combinations of weighting functions and grid using the acoustic source localization system.

FIG. 12 shows an example of the different combinations of weighting functions and grid that may be used for the acoustic source localization system while FIG. 13 illustrates results from a car engine example using different combinations of weighting functions and grid using the acoustic source localization system and FIG. 14 illustrates results from a car horn example using different combinations of weighting functions and grid using the acoustic source localization system. Each different combination of weighting function and grid shown in FIG. 12 (such as the hybrid-hybrid combination) may be referred to as a variable set for the distance estimation or the angle estimation. Furthermore, the variable set for each of the distance estimation and the angle estimation may be the same (see unweighted-Rect, PHAT-Rect and PHAT-Polar combinations) or may be different (see Hybrid-Rect, Hybrid-Polar and Hybrid-Hybrid combinations).

As shown in FIGS. 13-14, the proposed hybrid-weighting multi-gridding approach (Hybrid/Hybrid in FIG. 12) has the best error under all metrics for the two testbeds. This highlights both the high accuracy and the robustness of the proposed system that is summarized the chart in FIG. 15. The evaluation example above has at least 1200 estimates for location/angle (=10 locations*60 seconds*2 sound blocks). The average of these estimates for the location/angle error from both testbeds is presented in FIG. 15 along with the average numbers for the techniques in FIGS. 13 and 14.

The percentages shown in FIG. 15 may be calculated using the following equation:

$$\text{percentage} = (\text{Best mean error} - \text{current technique mean error}) \div \text{Best mean error} \times 100.$$

For example, the minimum (best) mean error for angle estimation in Testbed 2 is 9 degrees using the Hybrid/Hybrid approach. We want to calculate Hybrid/Hybrid enhancement percentage over the Direct fusion approach which has a mean angle error equals to 16.7. Using the previous equation, the enhancement of Hybrid/Hybrid over the Direct fusion is $$\text{percentage} = (9 - 16.7) \div 9 \times 100 = 85.5\%.$$

Thus, as shown in FIG. 15, the disclosed system outperforms the current state-of-the-art techniques that use a single weighting function and a single type of gridding by at least 96.6% for the direction estimation and 5.35% for the location estimation. In addition, it outperforms the direct fusion approach by at least 85.5% and 3.57% for the direction and location estimation respectively.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:
receiving at least three signals from a source, wherein each signal is from a different source sensor in a set of source sensors;
determining, using the at least three received signals from the source, an estimate of a distance between the source and the set of sensors using a variable set having a grid and a weighting, wherein the grid is selected from one of a rectangular grid and a polar grid and the weighting is selected from one or more of unweighted general cross correlation, unweighted steered response power and a phase transform weighting;
determining, using the at least three received signal from the source, an estimate of an angle between the source and the set of sensors using a variable set having a grid and a weighting, wherein the grid is selected from one of a rectangular grid and a polar grid and the weighting is selected from one or more of unweighted general cross correlation, unweighted steered response power and a phase transform weighting and wherein the grid and weighting for the angle estimate is one of the same as the grid and weighting for the distance estimate and different than the grid and weighting for the distance estimate; and
combining the distance estimate and angle estimate for the source to generate a location estimate for the source.

2. The method of claim 1 further comprising performing in parallel the distance estimate determination and the angle estimate determination.

3. The method of claim 2 further comprising using a Hybrid-Hybrid variable set combination for the distance estimate determination and the angle estimate determination.

4. The method of claim 2, wherein the variable set for determining the distance estimate further comprises a rectangular grid and an unweighted steered response power weighting.

5. The method of claim 4, wherein the variable set for determining the angle estimate further comprises a polar grid and a phase transform weighting.

6. The method of claim 1 further comprising using a Hybrid-Hybrid variable set combination for the distance estimate determination and the angle estimate determination.

7. The method of claim 1, wherein the variable set for determining the distance estimate further comprises a rectangular grid and an unweighted steered response power weighting.

8. The method of claim 7, wherein the variable set for determining the angle estimate further comprises a polar grid and a phase transform weighting.

9. The method of claim 1 further comprising segmenting each signal from the source into equally sized blocks.

10. The method of claim 1, wherein receiving the at least three signals from the source further comprises using a microphone array having at least three microphones wherein each microphone receives one of the at least three signals from the source.

11. The method of claim 1, wherein the source is an acoustic source.

12. A system, comprising:
a set of sensors that receives at least three signals from a source;
a computer system having a processor with a plurality of lines of instructions executed by the processor and the computer system is configured to:
determine, using the at least three received signals from the source, an estimate of a distance between the source and the set of sensors using a variable set having a grid and a weighting, wherein the grid is selected from one of a rectangular grid and a polar grid and the weighting is selected from one or more of unweighted general cross correlation, unweighted steered response power and a phase transform weighting;
determine, using the at least three received signal from the source, an estimate of an angle between the source and the set of sensors using a variable set having a grid and a weighting, wherein the grid is selected from one of a rectangular grid and a polar grid and the weighting is selected from one or more of unweighted general cross correlation, unweighted steered response power and a phase transform weighting and wherein the grid and weighting for the angle estimate is one of the same as the grid and weighting for the distance estimate and different than the grid and weighting for the distance estimate; and
combine the distance estimate and angle estimate for the source to generate a location estimate for the source.

13. The system of claim 12, wherein the processor is further configured to perform, in parallel, the distance estimate determination and the angle estimate determination.

14. The system of claim 13, wherein the processor is further configured to use a Hybrid-Hybrid variable set combination for the distance estimate determination and the angle estimate determination.

15. The system of claim 13, wherein the processor is further configured to use a rectangular grid and an unweighted steered response power weighting to determine the distance estimate to the source.

16. The system of claim 15, wherein the processor is further configured to use a polar grid and a phase transform weighting to determine the angle estimate.

17. The system of claim 12, wherein the processor is further configured to use a Hybrid-Hybrid variable set combination for the distance estimate determination and the angle estimate determination.

18. The system of claim 12, wherein the processor is further configured to use a rectangular grid and an unweighted steered response power weighting to determine the distance estimate to the source.

19. The system of claim 18, wherein the processor is further configured to use a polar grid and a phase transform weighting to determine the angle estimate.

20. The system of claim 12, wherein the processor is further configured to segment each signal from the source into equally sized blocks.

21. The system of claim 12, wherein the set of sensor further comprises a microphone array having at least three microphones wherein each microphone receives one of the at least three signals from the source.

22. The system of claim 12, wherein the source is an acoustic source.

* * * * *